April 2, 1963  E. G. VANDERLIP  3,083,934
ROTARY WING AIRCRAFT
Filed Oct. 12, 1961

INVENTOR.
EDWARD G. VANDERLIP
BY William E. Cleaver
ATTORNEY

United States Patent Office 3,083,934
Patented Apr. 2, 1963

3,083,934
ROTARY WING AIRCRAFT
Edward G. Vanderlip, 206 Upland Way, Wayne, Pa.
Filed Oct. 12, 1961, Ser. No. 144,710
13 Claims. (Cl. 244—5)

This invention relates to rotary wing-type aircraft and more particularly to a rotary wing-type aircraft which is characterized by relatively large lifting power.

Rotary wing-type aircraft, such as helicopters, are widely used because of their ability to fly vertically and their ability to hover. Because of these capabilities helicopters have been used very successively in rescue work, short flights into densely built-up areas, observation work, etc. Rotary wing-type aircraft, however, in the past have had some shortcomings. For instance in order to obtain a high ratio of lift to power, it has been considered necessary to increase to rotor diameter, assuming that it is desirable to keep the disc loading low (disc loading being the ratio of the gross weight to the sweep area of the rotor). Such an arrangement is costly if large loads are to be lifted. High disc loading, per se, requires higher power. On the other hand if the rotor diameter is not increased and high disc loading is employed then the rate of descent, in the event the aircraft autorotates (possibly with a power failure), is dangerously high. A rotary wing aircraft which has the advantages of vertical flight and ability to hover, and which in addition has a relatively large ratio of lift to power while being aerodynamically stable is obviously desirable.

Accordingly it is an object of the present invention to provide an improved rotary wing aircraft.

It is a further object of the present invention to provide a rotary wing aircraft having a high ratio of lift to power.

It is a further object of the present invention to provide a rotary wing aircraft having a high degree of aerodynamic stability.

Another object of the present invention is to provide a rotary wing aircraft having an improved autorotation characteristic.

In accordance with a feature of the present invention there is provided an inflated fabric ring secured to a shroud, or metal duct, the supporting structure of which supports the aircraft. This inflated fabric ring provides a lighter-than-air characteristic for the present aircraft and tends to make the empty load of the aircraft approach zero. Further, the inflated ring causes more air to be drawn through the duct in the upward direction, when the aircraft autorotates, than is normally drawn through the rotors of a helicopter during such a maneuver.

In accordance with another feature of the present invention the last-mentioned shroud, or duct, acts with the rotors of the present aircraft in accordance with ducted rotor theory to increase the vertical thrust or lift of the present aircraft.

In accordance with another feature of the present invention the supporting structures of the last-mentioned shroud, or duct, are equipped with a first set of flaps, which when operated in the slip stream provides an additional forward thrust component to the present aircraft, and with a second set of flaps, which when operated in the slip stream controls the present aircraft with respect to torque produced by the driving rotors.

The above-mentioned and other features and objects of this invention will become more apparent by reference to the following description taken in conjunction with the accompanying drawings in which.

It should be understood that the present aircraft operates with respect to control of movement similarly to a helicopter. For instance, the cyclic control of the rotors in the present aircraft tilts the aircraft in the direction of the desired movement and also provides a means for compensating for some aerodynamic disturbances. The vertical flight of the present aircraft depends (as does a helicopter) on the increase or decrease of pitch of all of the rotor blades. The action or control of all of the rotor blades is accomplished by collective control, as found in a helicopter. The same control mechanism, both in the cockpit and physically connected to the rotor blades, as are found in a helicopter are employed in the present aircraft.

The present aircraft uses an integrated lift principle. It employs a helium inflated torus ring to provide lift due to a lighter-than-air characteristic. The present aircraft also uses a ducted rotor which increases its lifting power by (1) reducing the air pressure over the upper lip, (2) preventing the shedding off of the blade tip vortex, and (3) minimizing the contraction of the slip stream after it passes the rotor blades. These foregoing improvements in lifting power combined with the normal lifting power of the driving rotors (the latter being characteristic of a helicopter) provides the integrated lift.

Because the weight of the inflatable fabric is considerable there is a lower practical limit to the design of the present aircraft. It has been found that with currently available materials the present aircraft is useful only with rotor systems wherein the diameter of the rotor sweep area is 25 feet or larger. However, it should be understood that with the introduction in the future of lighter fabric, having the same strength qualities as the materials now used, the practical limit for the diameter of the rotor sweep area will be reduced.

Although the present aircraft has a lighter-than-air characteristic it is nevertheless on the over-all a heavier-than-air aircraft and the torus ring lift is not normally made large enough to cause the present over-all aircraft to be lighter-than-air. The torus ring lift is designed so that the thrust or lift provided by the driving rotors is substantially all applied to the payload. In other words the torus ring lift is determined to equal the empty weight plus that portion of the useful weight not attributed to payload (i.e., crew, fuel, etc.).

Figure 1:
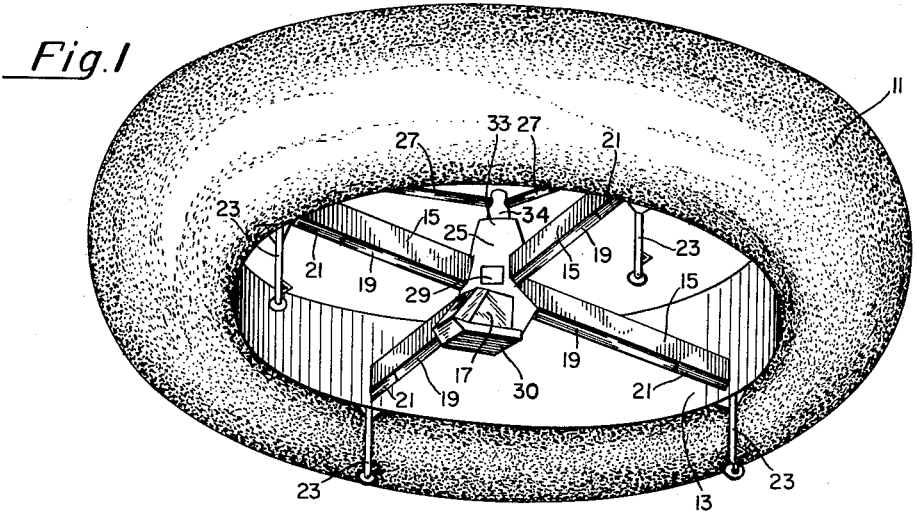
FIGURE 1 is a perspective view of one embodiment of the present invention.

Consider FIGURE 1 which is a perspective view of the present aircraft. In FIGURE 1 the helium inflated fabric ring 11 is shown bonded or secured to a sheet metal duct 13. The duct could be made of some other rigid material. The inflatable ring 11 can be made of rubberized nylon fabric or some other suitable lightweight tough wearing fabric. The inflatable ring can be secured to the sheet metal duct by lacing the fabric to tie-rings on the peripheral structure of the duct; or in another manner, patches of the ring fabric with loops formed thereof can be sewed on to the inside surface of the inflatable ring and these loops can be hooked to tie-rings on the outer surface of the metal-duct 13. As will be described in more detail hereinafter, very often a triangular shaped frame (frame 31a in FIG. 2) is secured to the outer surface of the duct 13 to hold the inflated ring partially away from the duct in order to get maximum inflation of the ring 11. In this last described embodiment the ring fabric is secured to the triangular framework by lacing, tie-rings, sewing, etc. It, of course, is necessary to provide maximum strength for the ring securing means because the lift of the present aircraft depends to a large extent upon the lighter-than-air principle of the inflated ring. The lifting power of the inflated ring is effective on the duct and the remainder of the aircraft through the means securing the inflatable ring to the duct and hence such means must be of maximum strength. The sewing and lacing is accomplished with nylon cord or its equivalent.

Examining FIGURE 1 further, it can be seen that the metal duct 13 is supported by four support stators 15. The support stators 15 provide structural rigidity to the aircraft, provide a means for shaping the aircraft, provide a means for supporting the cabin 17 wherein the crew and the controls for the aircraft are housed, and provide a means for supporting the center pod, including the power plant 25, the fuel tanks 29 and the hoist mechanism 30. the stators are made of conventional air frame metal. The hoist mechanism can consist of a winch means driven hydraulically and employing cables to be fastened to the load. In addition, to the structural support role they play, the stators 15 each has an inside flap 19 and an outside flap 21 to be operated to increase the forward thrust and provide torque control, respectively, for the present aircraft, as will be more fully described hereinafter. Also in FIGURE 1 there are shown four wheels or landing gear devices 23 connected to the metal duct 13. These wheels may be retractable if the forward speed of the aircraft so warrants.

In the center of the four stators 15 there is secured a power plant or motor 25. The motor can be any standard motor used for helicopter machines and an example of such a motor is a 825 horsepower Lycoming T–53–L–1, manufactured by the Lycoming Division of the Avco Mfg. Corp.

Through a reduction gear device 33 and a collective and cyclic control system 34 the engine 25 drives the rotors 27, Any one of a number of standard collective and cyclic control systems can be used (e.g., the system described in U.S. Patent No. 2,318,259, issued to I. Sikorsky) and in a preferred embodiment an H–19D rotor control system, manufactured by the Sikorsky Corp., is employed.

As will be more clearly seen in FIGURE 2, the normal fuel tanks 29 are located below the motor 25. Additional fuel tanks if desired can be secured to the periphery or underside of the duct ring 13. As will be described in more detail in connection with FIGURE 2, a hydraulic hoist is provided as part of the over-all center-pod structure.

The present aircraft can be provided with sufficient lift by virtue of the inflated ring 11 to make its effective empty weight approach zero. It should be understood that the inflated ring lift can be designed to be any percentage of empty weight. In this way all of the thrust provided by the rotor movement can be used to lift a payload or useful weight. Despite the lghter-than-air characteristic of the persent aircraft (in employing an inflated ring 11), it has the advantages of the heavier-than-air aircraft as related to maneuverability, speed, etc. The collective and cyclic control of the rotors gives the present aircraft all the advantages of a helicopter with respect to maneuverability and speed.

Figure 3:
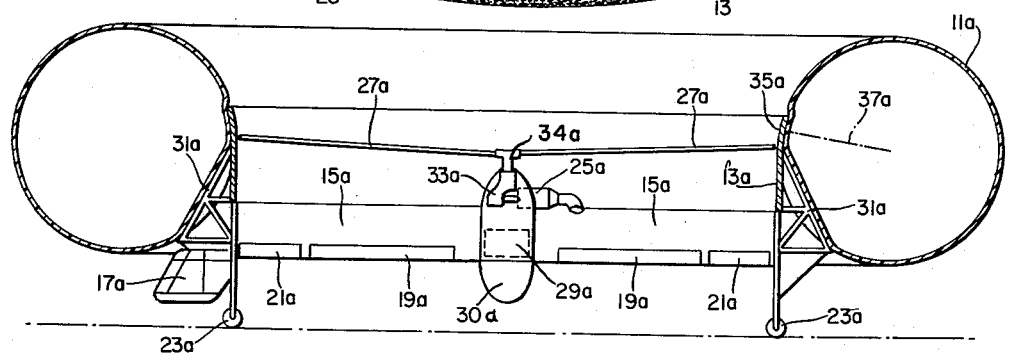
FIGURE 3 is an enlarged sectional view of the second embodiment of the present invention, shown in FIGURE 2.
Figure 2:
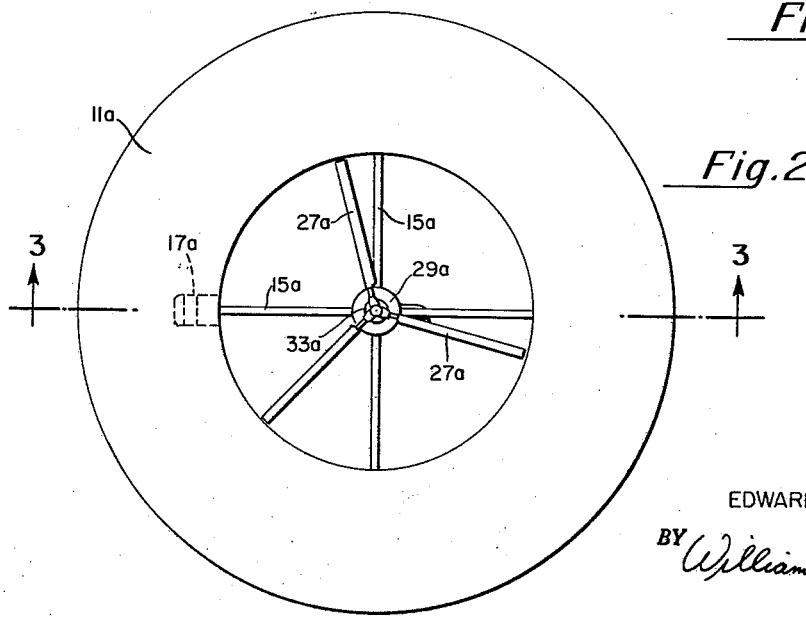
FIGURE 2 is a plan view of a second embodiment of the present invention.

FIGURE 2 is the top plan view of a second embodiment of the present aircraft, and FIGURE 3 is an enlarged sectional view of FIGURE 2. Consider FIGURES 2 and 3 together and in particular FIGURE 3 which shows in more detail many of the components described in FIGURE 1. As can be seen in FIGURE 3 the inflated ring 11a is secured to the triangular frame 31a in such a manner that the ring 11a can be virtually fully inflated which provides for more lift for a given ring.

In FIGURE 3 the motor 25a is depicted as a turbine model which is connected through a drive shaft to a gear reduction chain or gear reduction box 33a thereby reducing the speed of the engine to drive the rotor blades 27a at between 600 to 700 feet per second. The rotors 27a are standard helicopter rotor blades and in a preferred embodiment each has approximately an 8% twist to compensate for the difference in speed along its length, and hence even out the lift distribution along the length of the rotor blade. It should be understood that some other percentage of twist could be used. It will be further noted in FIGURE 3 that the cabin 17a is secured to the structure and located beneath the inflated ring 11a.

When the rotor blades 27a are being driven and air is being forced through the inside of the duct ring 13a, the slip stream passes over the stators 15a. The outside flaps 21a of the stators 15a are rocked to one side to provide torque control as the slip stream passes thereover since the present aircraft has no anti-torque rotor to provide torque compensation (as does a helicopter). In other words, the present aircraft (i.e., ring, cabin, etc.) would rotate opposite from the rotation of the rotors due to torque just as happens with a helicopter. The flaps 21a are rotated or rocked into the slip stream in such a fashion that the slip stream force thereon urges the aircraft in the direction opposite form the torque force and hence the aircraft is held from rotating due to torque. The flaps 21a as well as the flaps 19a are controlled by a bell crank-lever and push-pull rod system similar to that used to control the rudders and elevators in conventional aeroplanes.

The flaps 19a are rocked into the slip stream to provide an additional component of forward thrust to the present aircraft. The reaction of the open flaps against the air stream provides a forward thrust component to the present aircraft.

The present aircraft has three characteristics which increases its rotor thrust in addition to the forward thrust (a component of vertical thrust) gained by employing flaps 19a. The radius 37a of the ring 11a is designed to be greater than 6% of the diameter of the rotors. In accordance with the theory of a ducted rotor if the radius of the lip 35a (therefore the radius of the ring) of the duct 13a is greater than 6% of the rotor diameter, then maximum lift is obtained due to reduced pressure on the upper portion of the lip in response to the airflow over the lip. Hence by designing the lip 35a to have a radius greater than 6% of the rotor 27 diameter the vertical thrust of the aircraft is increased.

Secondly and in accordance with ducted rotor theory the slip stream does not contract after it passes through (from top to bottom) the rotors 27a. It has been recognized that the contraction of the slip stream in the operation of the standard helicopter (non-ducted rotor arrangement) reduces the vertical thrust available. Accordingly, the present aircraft provides a second element of increased vertical thrust.

Thirdly the duct 13a prevents the "normal" rotor tip vortex from being shed off the tip end by physically trapping the air which is the medium for the rotor tip vortex phenomenon. It has been recognized that the vortex phenomenon which occurs at the rotor tips as the rotor whirls around, reduces the possible vertical thrust obtainable by a rotary wing aircraft. By preventing this rotor tip vortex from shedding from the tip the present aircraft provides a third element of increased vertical thrust. This arrangement effectively increases the aspect ratio of the rotor blades.

The provision of the inflated ring 11a streamlines the present aircraft as would not be the case if only the metal duct 13a were provided. The streamlining effect, of course, has considerable advantage for both horizontal and vertical flight as compared with an arrangement where the present aircraft attempted movement (especially horizontal movement) with the blunt outer wall of the metal duct 13a pushing through the air. While the inflatable means is depicted as a torus ring, it should be understood that some other shaped inflatable means might be used, or a plurality of inflatable devices secured to the duct might be employed.

It becomes clear that the present aircraft operates at very high efficiency. By employing the inflated ring 11 to cause the empty load value to approach zero, the present aircraft enables virtually all of the thrust generated by the rotors to be used for lifting a payload (cargo and/or passengers). In addition to applying the rotor thrust directly to the payload, the present aircraft provides a means for increasing the rotor thrust thus further increasing the payload that can be lifted. The means for increasing the rotor thrust includes the presence of the shroud or duct, the design of the duct lip, and the inclusion of the stator flaps. Finally, the stator flaps increase stability and control to the present aircraft which is both desirable and necessary.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. A duct means to be used with the rotor means of a rotary wing aircraft comprising: annular shroud means having its inside wall formed to lie in close proximity around the outside of the rotor blade tip path of said rotor means but not to touch said path; and inflatable means secured exclusively to the outside wall of said annular shroud, said inflatable means being filled with lighter-than-air gas to provide lighter-than-air characteristics for said aircraft.

2. A rotary wing aircraft comprising in combination; rotor means adapted to be connected to power means for driving said rotor means; annular shroud means having its inner wall disposed in close proximity around the outside of the rotor blade tip path of said rotor means but not touching said path; and inflatable means secured exclusively to the outside wall of said annular shroud, said inflatable means being filled with lighter-than-air gas to provide lighter-than-air characteristics for said aircraft.

3. A rotary wing aircraft comprising in combination: rotor means; power means connected to said rotor means for driving thereof; duct means, being made of rigid material, having its inner wall disposed in close proximity around the outside of the rotor blade tip path of said rotor means but not touching said path; and inflatable means secured exclusively to the outside wall of said duct means, said inflatable means when inflated having a substantially circular cross section with a diameter at least as large as the depth of said duct means and providing lighter-than-air characteristics for said aircraft.

4. A rotary wing aircraft according to claim 3 wherein there is further included collective and cyclic control means to vary the pitch of the rotor blades of said rotor means.

5. A rotary wing aircraft comprising in combination: rotor means adapted to be connected to power means; collective and cyclic control means connected to said rotor means to vary the pitch of the rotor blades thereof; duct means, being made of rigid material, having its inner wall disposed in close proximity around the outside of the rotor blade tip path of said rotor means but not touching said path; stator means supporting said duct means and having operable flaps therein to control the torque reaction of said aircraft; and inflatable means secured exclusively to the outside wall of said duct means, said inflatable means when inflated having a substantially circular cross section with a diameter at least as large as the depth of said duct means and providing lighter-than-air characteristics for said aircraft.

6. A rotary wing aircraft comprising in combination: rotor means; collective and cyclic control means connected to said rotor means to vary the pitch of the rotor blades of said rotor means; power means connected to said rotor means to drive the same; duct means, being made of rigid material, having its inner wall disposed in close proximity around the outside of the rotor blade tip path of said rotor means but not touching said path; stator means supporting said duct means and having operable flaps therein to increase the forward thrust component of said aircraft; and inflatable means secured exclusively to the outside wall of said duct means, said inflatable means when inflated providing lighter-than-air characteristics for said aircraft.

7. A rotary wing aircraft comprising in combination: rotor means; collective and cyclic control means connected to said rotor means to vary the pitch of the rotor blades of said rotor means; power means connected to said rotor means to drive the same; duct means, being made of rigid material, having its inner wall disposed in close proximity around the outside of the rotor blade tip path of said rotor means but not touching said path; stator means supporting said duct means and having first and second sets of operable flaps therein to respectively control the torque reaction of said aircraft and increase the forward thrust component of said aircraft; cabin means connected to said stator means; and inflatable means secured exclusively to the outside wall of said duct means which when inflated have a substantially circular cross section with a diameter at least as large as the depth of said duct means and which provide lighter-than-air characteristics for said aircraft.

8. A rotary wing aircraft according to claim 7 wherein said inflatable means is a torus ring means inflated with helium.

9. A rotary wing aircraft according to claim 7 wherein said cabin means is disposed in the center of said stator means beneath said rotor means and secured to said stator means.

10. A rotary wing aircraft according to claim 7 wherein said cabin means is disposed at the periphery of said duct means and beneath said inflatable means.

11. A rotary wing aircraft comprising in combination: rotor means; collective and cyclic control means connected to said rotor means to vary the pitch of the rotor blades of said rotor means; power means connected to said rotor means to drive the same; duct means, being made of rigid material, having its inner wall disposed in close proximity around the outside of the rotor blade tip path of said rotor means but not touching said path, said duct means having its outside wall partially concave with a radius of curvature which is greater than 6% of the diameter of said rotor means; stator means supporting said duct means and having first and second sets of operable flaps therein to respectively control the torque reaction of said aircraft and increase the forward thrust component of said aircraft; cabin means secured to said stator means; and inflatable means secured to the outside wall of said duct means, when said inflatable means is inflated it provides lighter-than-air characteristics for said aircraft.

12. A rotary wing aircraft comprising in combination: rotor means; collective and cyclic control means connected to said rotor means to vary the pitch of the rotor blades of said rotor means; turbine engine means connected to said rotor means to drive the same; an annular sheet metal duct having its inner wall disposed in close proximity around the outside of the rotor blade tip path of said rotor means but not touching said path, said sheet metal duct having its outside wall partially concave with a radius of curvature which is greater than 6% of the diameter of said rotor means; a plurality of stator struts, each secured at one end to said sheet metal duct and protruding toward the center of said sheet metal duct and supporting thereat said turbine engine; each of said stator struts having first and second operable flaps therein to respectively control the torque reaction of said aircraft and increase the forward thrust component of said aircraft; cabin means secured to said stator struts; and a helium inflated torus ring secured to the outside wall of said sheet metal duct to provide a lighter-than-air characteristic for said aircraft.

13. A rotary wing aircraft comprising in combination:
(a) rotor means
(b) collective and cyclic control means connected to said rotor means to vary the pitch of the rotor blades of said rotor means;
(c) power means connected to said rotor means to drive the same;
(d) duct means, being made of rigid material, having its inner wall disposed in close proximity around the outside of the rotor blade tip path of said rotor means but not touching said path;
(e) stator means supporting said duct means, said stator means having first operable flaps therein to increase the forward thrust component of said aircraft and having second operable flaps to control the torque reaction of said aircraft;
(f) and inflatable means secured exclusively to the outside wall of said duct means, said inflatable means having a radius greater than 6% of the diameter of said rotor means and when inflated providing lighter-than-air characteristics for said aircraft.

References Cited in the file of this patent

UNITED STATES PATENTS

| | | |
|---|---|---|
| 1,667,002 | Hall | Apr. 24, 1928 |
| 2,939,535 | Brye | June 7, 1960 |
| 2,948,111 | Nelson | Aug. 9, 1960 |

FOREIGN PATENTS

| | | |
|---|---|---|
| 1,186,372 | France | Feb. 23, 1959 |

OTHER REFERENCES

"Aviation Week," Mar. 10, 1958, page 25.